United States Patent [19]
Baratte et al.

[11] Patent Number: 4,652,078
[45] Date of Patent: Mar. 24, 1987

[54] ELECTRO-OPTICAL DIRECTIONAL COUPLER WITH THREE ELECTRODES AND ALTERNATING DEPHASING

[75] Inventors: Hervé Baratte, Sucy-en-Brie; Dominique Lesterlin, Courbevoie; Alain Carenco, Bourg-La-Reine, all of France

[73] Assignee: L'Etat Francais represente par le Ministre des PTT (Centre National d'Etudes des Telecommunications), Issy Les Moulineaux, France

[21] Appl. No.: 609,017

[22] Filed: May 10, 1984

[30] Foreign Application Priority Data

May 10, 1983 [FR] France .................. 83 07807

[51] Int. Cl.$^4$ .............................................. G02B 6/10
[52] U.S. Cl. ................................. 350/96.14; 350/96.13
[58] Field of Search ............... 350/96.11, 96.12, 96.13, 350/96.14

[56] References Cited

U.S. PATENT DOCUMENTS

| 3,909,108 | 9/1975 | Taylor | 350/96.14 |
| 4,448,479 | 5/1984 | Alferness | 350/96.14 |
| 4,468,086 | 8/1984 | Liu | 350/96.14 |

FOREIGN PATENT DOCUMENTS

| 3202932 | 4/1983 | Fed. Rep. of Germany. |
| 2314513 | 1/1977 | France. |

OTHER PUBLICATIONS

Applied Physics Letters, vol. 28, No. 9, (May 1, 1976), R. V. Schmidt et al, "Electro-Optically Switched Coupler With Stepped Beta Reversal Using Ti-diffused LiNbO3 Waveguides," pp. 503-506.

Primary Examiner—William L. Sikes
Assistant Examiner—Frank González
Attorney, Agent, or Firm—Oblon, Fisher, Spivak, McClelland & Maier

[57] ABSTRACT

The electrode structure comprises in each section three parallel microbands of identical width, the first and second microband covering first and second optical guides respectively and being separated by a width giving to the propagating line which they form a characteristic impedance equal to the required adaptation impedance; the third microband is far enough away from the second band for the contribution of the former to such characteristic impedance to be negligible. The covering of the first and second optical guides by the first and second microbands alternates from one section to the next section and the passage from a first section to a second section is obtained by a transition zone comprising inclined microbands.

1 Claim, 13 Drawing Figures

ELECTRO-OPTICAL DIRECTIONAL COUPLER WITH THREE ELECTRODES AND ALTERNATING DEPHASING

BACKGROUND OF THE INVENTION

The invention relates to an electro-optical directional coupler and is applicable in integrated optics.

Amongst the various forms which an electro-optical directional coupler can take, the simplest is the one shown in FIG. 1. This is a device comprising a light-propagating structure formed by a substrate 10 containing two optical wave guides G1 and G2 made of an electro-optical material. This structure is covered by a structure of electrodes comprising two conductive microbands MB and MB′ deposited on the substrate and at least partially covering the two optical guides. One of the electrodes is connected to a direct voltage source 12, the other being connected to ground. The light enters via the guide G1 and leaves via one and/or the other of the guides. For reasons of convenient access, the guides move away from one another at their ends in the flaired shape shown in FIG. 1.

The device operates as follows. The two guides are close enough to one another for there to be a coupling between them by an evanescent wave. In each guide the light propagation is characterized by a propagation constant $\beta_1$ and $\beta_2$ respectively, whose value can be modified by the application of an electric field. When different fields are applied to the two guides, a "dephasing" $\Delta\beta = \beta_1 - \beta_2$ appears. Then a transfer length equal to $\pi/2k$ is defined, where k is the coefficient of coupling between guides: this is the minimum length of the guides required for obtaining a total transfer of the light from one guide to the other. If the dephasing $\Delta\beta$ is zero, we obtain a total transfer of the input guide G1 to the guide G2, when the total length of the device L is an odd whole multiple of the transfer length l. The incident light entering the guide G1 then leaves by the guide G2. This state will be called a "crossed state" and have the reference X. If the length L of the coupler is an even multiple of l, the light leaves by the guide G1. This state will be called the "direct state" and have the notation O.

By applying a voltage to one of the electrodes we modify the dephasing $\Delta\beta$ and we can pass from a crossed state to a direct state. In other words, the light intensity extracted from one of the guides is modulated.

FIG. 2 shows a more elaborate variant of this device. In this variant two identical sections S1 and S2 are formed by microbands $M_1$, $M'_1$ and $M_2$, $M'_2$. These sections have alternating dephasings $+\Delta\beta$ and $-\Delta\beta$, the alternation being obtained by permutating the electric connections from one section to the other.

The operation of the device is illustrated by the graph (FIG. 3), which shows the different states of the device as a function of two parameters, the first $(\Delta BL)/\pi$, proportional to the voltage V applied, and which is plotted on the abscissa, and the second parameter L/1, which is fixed for a given configuration and is plotted on the ordinate axis. When the voltage V is modulated, the point representing the system is displaced on a horizontal segment. The lines marked on the graph correspond to the purely crossed or purely direct states. Preferably a modulation segment such as 15 is selected, which extends between a crossed state and a direct state. The modulation can be obtained by applying a continuous polarization voltage Vc superimposed on an alternative voltage V.

The advantage of this structure, called an alternating dephasing, is to lead to a fairly large tolerance over the length of the active zone. The elementary device shown in FIG. 1, on the contrary, called for very high manufacturing precision. What is more, with an alternating dephasing coupler operation is possible over a wide band of the spectrum.

All these considerations are known by an engineer in the art and are discussed, for example, in the Paper by H. Kogelnik and R. V. Schmidt, entitled "Switched Directional Couplers with Alternating $\Delta\beta$", published in the Journal IEEE Journal of Quantum Electronics, vol. QE-12, No. 7, July 1976, pages 396–401.

In practice, to supply an alternating dephasing directive coupler, the approach is that shown in FIG. 4: a continuous voltage Vc is applied to the microbands $MB_1$ and $MB_2$ via resistors $R_1$ and $R'_2$ (for example, of 10 k$\Omega$); a high frequency voltage is applied to the microbands $MB_1$ and $MB_2$ by capacitors $C_1$ and $C_2$ (for example, of 33 nF) and by resistors $R'_1$ and $R'_2$ (for example, of 50$\Omega$). The values of the resistive and capacitive elements are so selected that the overall structure is adapted in impedance to the high frequency supply generator.

With a known electro-optical material such as LiNbO$_3$Ti and with a light radiation of 1.06 $\mu$m, we obtain with such a device a modulation band width of 2.5 GHz.

A device of this kind is described by P. Thioulouse, A. Carenco and R. Guglielmi in a Paper entitled "High-Speed Modulation of an Electrooptic Directional Coupler" published in "IEEE Journal of Quantum Electronics", vol. QE-17, No. 4, April 1981, pages 535–541.

Although such devices are satisfactory, they nevertheless come up against a difficulty when an attempt is made to further increase the width of the modulation band, since the response time of the resilient circuit is limited by the value of the localized constants of the electrodes and their adaptation elements (equivalent circuit R, L, C).

To overcome this difficulty it has been suggested to use as the structure of electrodes, microbands adapted to the impedance of the source forming a propagating line for the electric supply wave. The result is a progressive wave structure in which the electro-optic interaction is maintained from one end to the other of the guides, the ultimate limitation being formed by the differences between the speeds of propagation of the optical wave and the electric wave in the equipment in question.

FIG. 5 shows an equivalent electric circuit of such a structure. The generator 20 has an internal impedance 22 of value Zo, the propagating line 24 formed by the microbands has a characteristic impedance Zm, and this line is looped on a load resistor of value $R_1$.

The characteristics of such a structure are disclosed in the Paper by K. Kubota, J. Noda and O. Mikami entitled "Travelling Wave Optical Modulator Using a Directional Coupler LiNbO$_3$ Wave Guide" published in "IEEE Journal of Quantum Electronics", Vol. QE-16, No. 7, July 1980, pages 754–760.

In such a structure the band width offered for modulation depends on the characteristic impedance of the line formed by the microbands. This result is illustrated by the graph in FIG. 6, taken from the last-mentioned reference. The frequency is plotted on the abscissa and expressed in GHz, the response of the structure being plotted on the ordinate axis. The curves correspond to an internal impedance Zo of the generator equal to 50 ohms, a load resistor $R_1$ of 50 ohms, and an electrode length of 16 mm. The curves correspond to different values of the characteristic impedance Zm of the line. When Zm is lower than 50Ω, the band width at 3 dB is narrowed. Above 50Ω, the band width is almost the same as at 50Ω, but the disadaptation of the line causes the appearance of a steady wave rate and a reflection of the electric wave which is harmful to the satisfactory operation of the assembly. In practice, therefore, the electric line will be given a characteristic impedance of 50Ω. The band width will then be taken to about 3.6 GHz.

The problem is therefore to devise a structure of electrodes having a given impedance. This is not a very simple question, due to the very special shape of the line, formed by two parallel conductive microbands deposited on an insulating substrate. The last Paper cited envisages the case of two special structures, symmetrical and asymmetrical, which are shown in FIGS. 7a and 7b. The first one is formed by two identifical microbands, of width W, spaced out by an interval G. The second one is formed by a microband of width W and a microband of very great width in comparison with W, the two bands being separated by an interval G. The characteristic impedance Zm of each of these lines is shown in the graph (FIG. 8) where W/G is plotted on the abscissa and Zm on the ordinate axis. The two curves correspond to the two cases shown in FIGS. 7a and 7b. For the symmetrical line we obtain a characteristic impedance of 50Ω for $(W/G)=1.6$, while for the asymmetrical structure W/G must close to 0.5 to obtain the same impedance. This accounts for the result that, for a given impedance, the width W is much smaller in an asymmetrical structure than in a structure which is symmetrical.

By way of example, we can select, to obtain an impedance of 50Ω:

| a symmetrical line such as: | |
|---|---|
| G = 5 | W = 8 |
| G = 13 | W = 20.8 |
| an asymmetrical line such as: | |
| G = 5 | W = 2.5 |
| G = 13 | W = 6.5 | all expressed in micrometers.

Because of its wider electrodes, the symmetrical line has the following advantages over the asymmetrical line:
the wide and slightly separated optical guides (short l) can be covered with a suitable electro-optic efficiency,
the electrical losses are lower,
the passband, which is equally affected by the losses, as the last-cited Paper shows, is wider,
production is facilitated.

In practice, an electro-optic directional coupler with progressive wave takes the form illustrated in FIG. 9: one of the microbands MB receives at one of its ends the electric energizing wave via the central conductor 30 of a coaxial 32, the external conductor of such coaxial being connected to ground, the other being connected to the other microband MB'. The electric wave is extracted at the other end of the line by a conductor 30' and is dissipated in an adapted charge 31 of 50Ω.

It should be carefully observed that the progressive wave couplers just described are devices with only one section, and there is no question of using alternating dephasing structure as illustrated in FIG. 2, since it is very difficult to harmonize the two structures. However, a device has been proposed to take advantage simultaneously of the properties of the alternating dephasing structure and those of the progressive wave structure. This device is disclosed in the Paper by U. Langmann and D. Hoffman, entitled "200 ps stepped-$\Delta\beta$-operation of an integrated optical directional coupler switch" published in the Report on the 8th European Conference on Optical Communication ECOC at Cannes (1982, session BIII, integrated optics, pages 234–237).

This device is shown in FIG. 10. It comprises a structure of asymmetrical electrodes MB, MB', supplied by a high frequency wave generator, and an optical guide structure formed by two guides G1 and G2, which are not situated under the bands MB and MB', but under microbands mb, mb'. The latter are connected to the bands MB and MB' via conductors 40, so that the microbands mb, mb' covering one of the guides are connected alternately to one and the other of the bands MB and MB'.

The combination of the progressive structure with the alternating dephasing structure is therefore obtained by juxtaposing two subassemblies performing the two functions in question, and connecting them by alternate conductors.

This structure has many disadvantages:
it is clearly very complex,
the covering between the electric and optical structures is poor,
the progressive wave line is asymmetrical, resulting in the aforementioned disadvantages,
the connections 40, which introduce stray impedances, limit high frequency operation.

Following this presentation of the prior art, it must be remembered that it is very difficult to combine the advantages of progressive wave couplers with those of alternating dephasing couplers in the same structure.

PROBLEM OF THE INVENTION

It is precisely the aim of the invention to solve this problem by providing a very simple structure with a symmetrical propagating line and alternating dephasing. As a progressive structure, it leads to a very wide passband; being symmetrical, it has reduced losses, with the resulting advantages (cf. above); finally, since there is alternating dephasing, there are no strict tolerances about the length of the sections.

BRIEF STATEMENT OF THE INVENTION

All these aims are achieved according to the invention by a structure which is characterized by three points:
(a) the structure of electrodes comprises in each section three parallel microbands of identical width, the first and second microband covering the first and second optical guides respectively and being separated by a width giving to the propagating line which they form a characteristic impedance equal to the required adaptation impedance; the third microband is far enough away from the second band for the contribution of the former to such characteristic impedance to be negligible; the first and third microbands are connected electrically to the external conductor of the supply line, and the second microband is connected to the central conductor of such line;

(b) the covering of the first and second optical guides by the first and second microbands alternates from one section to the next section, in the sense that for a first section it is the first microband which covers the first guide and the second microband which covers the second guide, while for a second section, consecutive with the first section, it is the second microband which covers the first guide and the first microband which covers the second guide;

(c) the passage from a first section to a second section is obtained by a transition zone comprising: a first inclined microband section connecting the first microband of the first section to the third microband of the second section, a second inclined microband section connecting the second microband of the first section to the second microband of the second section, and a third inclined microband section connecting the third microband of the first section to the first microband of the second section.

BRIEF DESCRIPTION OF THE DRAWINGS

The features of such a device will be more clearly gathered from the following description of an exemplary, non-limitative embodiment, with reference to the accompanying drawings, which have already been described, namely.

DESCRIPTION OF PREFERRED EMBODIMENTS

Figure 1:
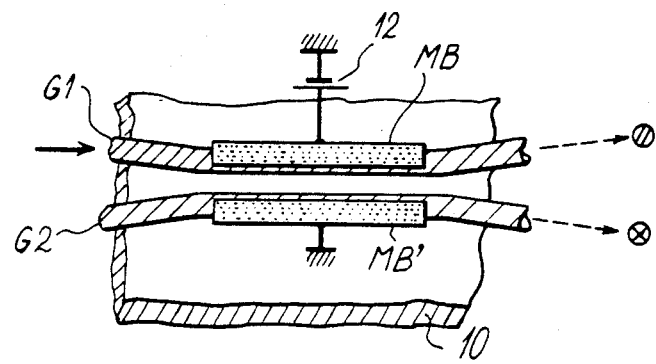
FIG. 1 shows a known directional coupler of simple type.
Figure 2:
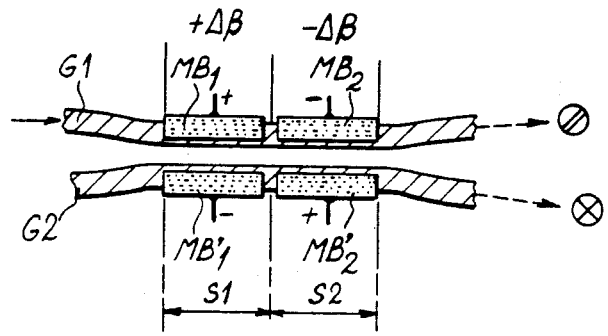
FIG. 2 shows a known directional coupler with alternating dephasing.
Figure 3:
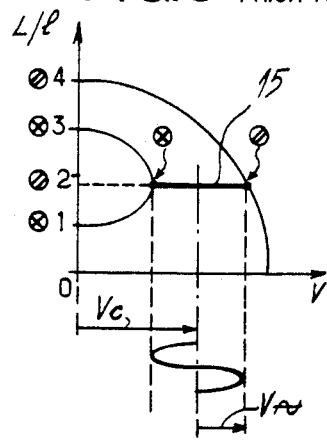
FIG. 3 is a graph explaining the operation of the preceding coupler.
Figure 4:
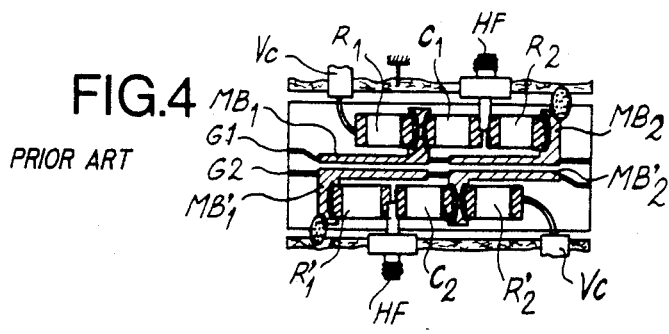
FIG. 4 shows a special embodiment of a prior art two-section coupler with its interconnecting components.
Figure 5:
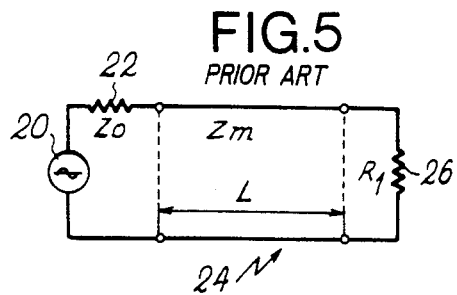
FIG. 5 shows an electric circuit equivalent to a progressive wave structure.
Figure 6:
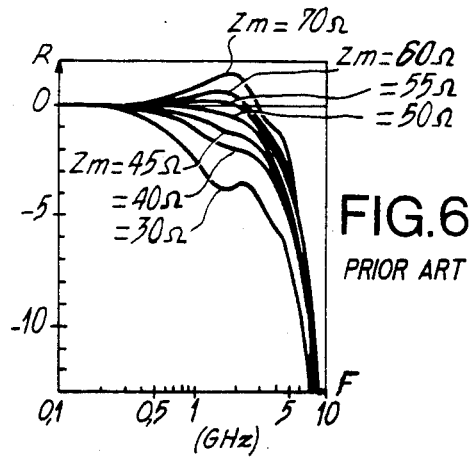
FIG. 6 is a graph illustrating the frequency behaviour of a progressive wave structure as a function of its characteristic impedance.
Figure 7A:
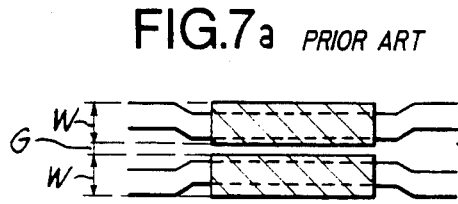
FIGS. 7a and 7b show symmetrical and asymmetrical structures of electrodes.
Figure 7B:
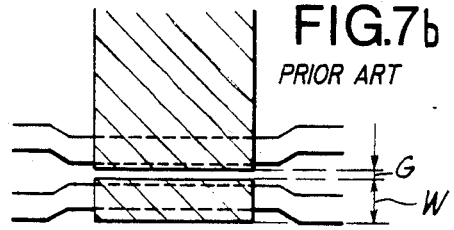
Figure 8:
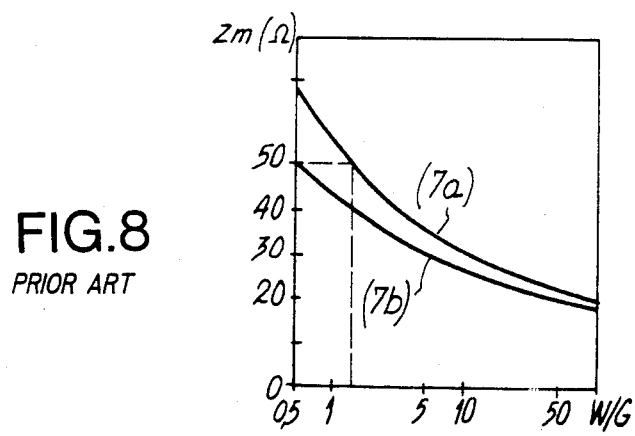
FIG. 8 is a graph illustrating the impedance variation of the preceding structures as a function of their dimensions.
Figure 9:
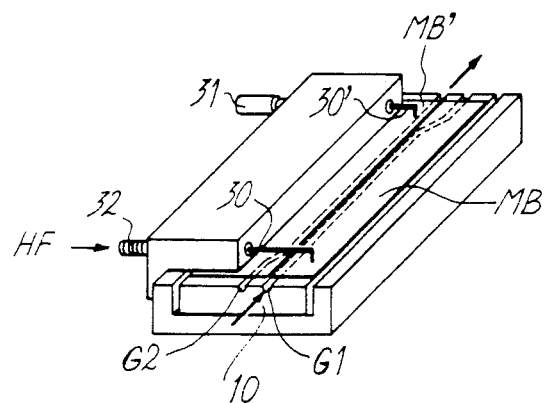
FIG. 9 illustrates an embodiment of a prior art progressive wave coupler.
Figure 10:
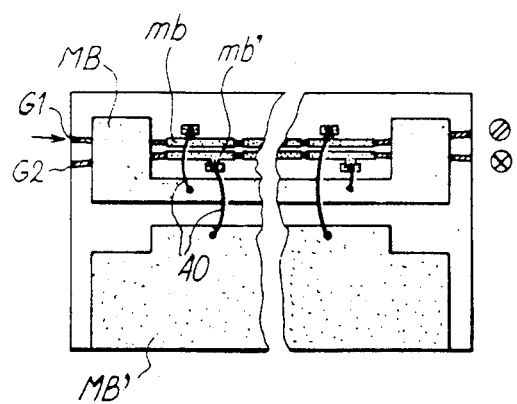
FIG. 10 shows a known attempt at combining a wave structure with an alternating dephasing structure.
Figure 11:
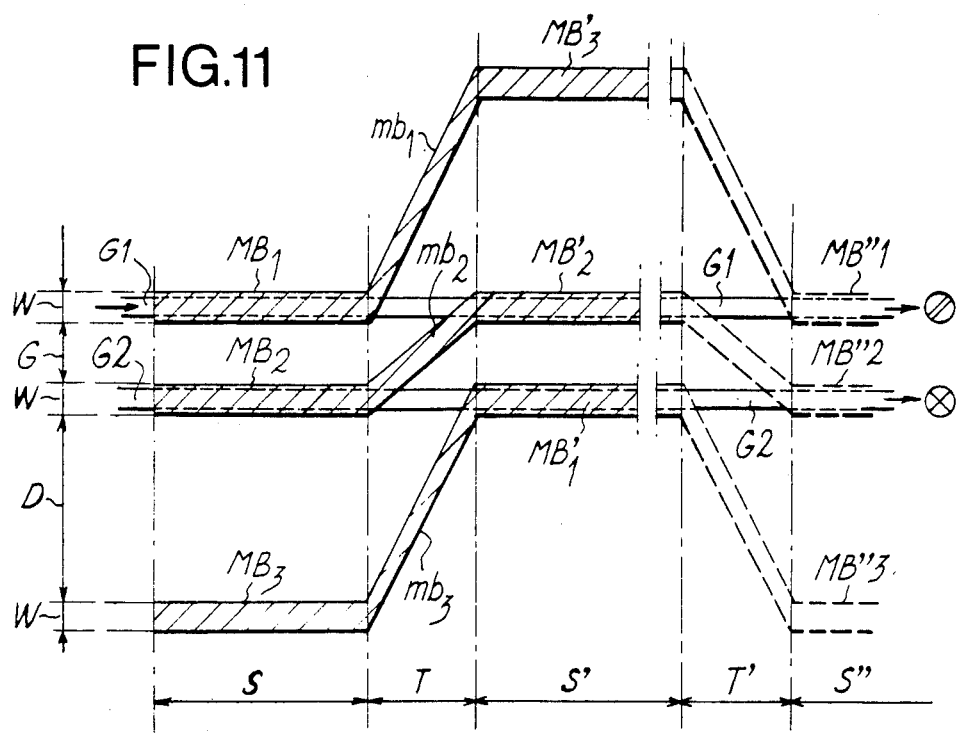
FIG. 11 shows the structure used according to the invention.

The coupler shown in FIG. 11 comprises two sections S and S' (although it could comprise more, S" etc ...) and a transition zone T. The structure of electrodes comprises in each section a first, a second and a third parallel microband, of identical width W, denoted by $MB_1$, $MB_2$ and $MB_3$ respectively. The first ($MB_1$) and the second ($MB_2$) microband respectively cover the first and second optical guides $G_1$ and $G_2$. These two microbands are separated by an interval of width G which gives to the propagating line formed by the two microbands a characteristic impedance equal to the required adaptation impedance—i.e., in practice 50Ω. The curve in FIG. 8 enables W/G to be determined. The examples given above can be retained. The third microband $MB_3$ is far enough away from the second microband $MB_2$ for its contribution to such characteristic impedance to be negligible. In practice the interval between $MB_2$ and $MB_3$ will be given a value D higher than ten times the value of G, for example, 20G. The first and third microbands ($MB_1$, $MB_3$) are electrically connected to the external conductor of the supply line—i.e., in practice, to ground, the second microband being connected to the central conductor of such line.

Like the first section, the second section of the device comprises three microbands, $MB'_1$ and $MB'_2$, $MB'_3$. The two first ones $MB'_1$ and $MB'_2$ are separated by an interval G, and the second and third ones $MB'_2$ and $MB'_3$ by an interval D. However, in this section and according to the second feature of the device according to the invention, the covering of the first and second optical guides by the first and second microbands $MB'_1$ and $MB'_2$ is symmetrical in relation to what it is in the first section. This means that for the first section S it was the first microband $MB_1$ which covered the first guide G1, the second microband $MB_2$ covering the second guide G2, while for the second section it is the second microband $MB'_2$ which covers the first guide G1, the first microband $MB'_1$ covering the second guide G2.

The passage between the first section S and the second section S' is performed by a transition zone T comprising: a first microband section $mb_1$ connecting the first microband $MB_1$ of the first section S to the third microband $MB'_3$ of the second section S', a second microband section $mb_2$ connecting the second microband $MB_2$ of the first section S to the second microband $MB'_2$ of the second section, and a third microband section $mb_3$ connecting the third microband $MB_3$ of the first section to the first microband $MB'_1$ of the second section.

Of course, this transition zone T disturbs the propagation in the line. However, it will be noted that at its two ends this transition zone has an impedance of 50Ω so that, if it is fairly short, it does not introduce much disadaptation. Moreover, at its centre this transition zone is formed by two parallel lines formed by two conductors separated by (G+D)/2, and it is always possible so to select D that the impedance of each of its parts is 100Ω, so that the assembly has an impedance of 50Ω. The variation in impedance along the transition zone is therefore practically zero, since such impedance is equal to 50Ω at each end and in the centre.

Figure 12:
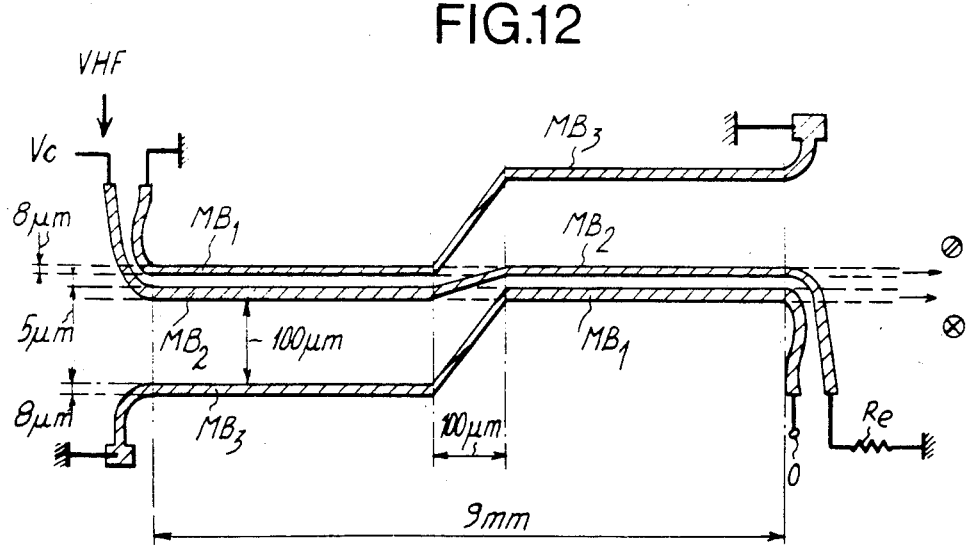
FIG. 12 illustrates an embodiment of a coupler according to the invention.

FIG. 12 shows an embodiment which is not to scale, to simplify the drawing. It corresponds to W=8 μm and D=100 μm. The total length of the interaction zone is 9 mm, the length of the transition zone being 100 μm. To facilitate the electric connections, the electrodes are curved, to free the optical inputs-outputs.

Figure 13:
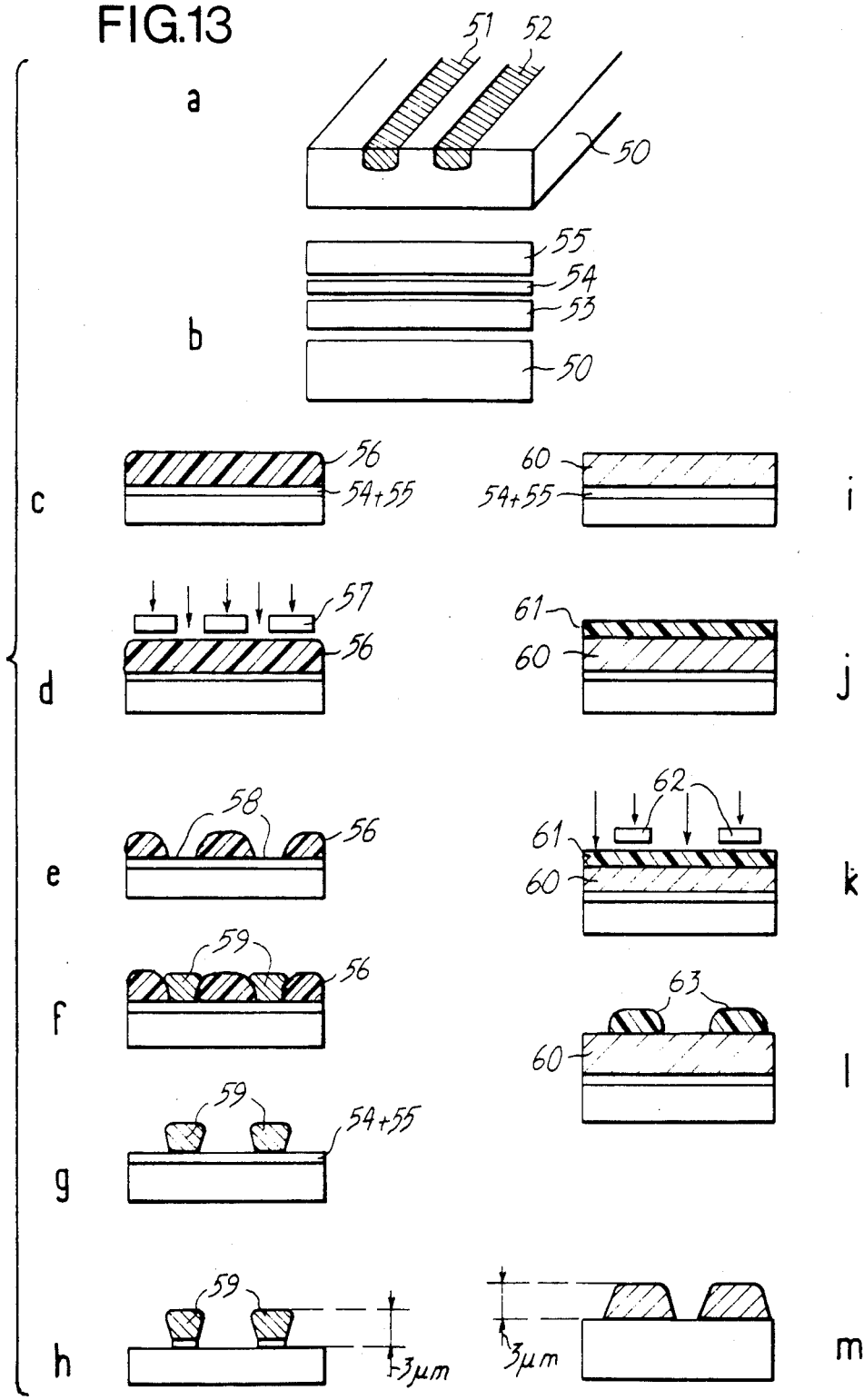
FIG. 13 shows various stages of a process of manufacturing the device according to the invention.

FIG. 13 illustrates various stages of a manufacturing process which can be used to make the device just described. The process mainly comprises the following operations:

1. The preparation of a lithium niobate sample and cutting along the z axis <001>.

2. The diffusion of titanium at high temperature in two ribbons corresponding to the future optical wave guides; the operation is performed in an enclosure containing lithium and oxygen; the duration is about 10 hours and the temperature 1000° C. Guides 51, 52 are obtained on a substrate 50 (FIG. a).

3. The depositing of an insulating layer of $SiO_2$ and an attaching layer of Ti/Au by cathode atomization; in FIG. b the substrate 50 is of $LiNbO_3$, the layer 53 of $SiO_2$ (3000 Å), the layer 54 of Ti (200 Å) and the layer 55 of Au (2000 Å).

4. The definition of a mask by one or the other of two techniques: negative mask or positive mask. In dependence on the variant used, the process is carried out in two different ways, corresponding to c to h in the left-hand column, and to i to m in the right-hand column respectively.

A. Cases in which a negative mask is used:
(A5) The depositing of a thick negative reserve 56 of thickness greater than 3 μm (FIG. 13c),
(A6) Putting the chromium mask 57 in place, its empty portions marking out the electrodes, and insulation by UV (FIG. 13d)
(A7) Withdrawal of the insulated zones 58 (FIG. 13e)
(A8) Filling of the empty spaces by gold 59, by electrolysis (FIG. 13f)
(A9) Disengagement of the resin, to leave only gold deposits 59 corresponding to the microbands (FIG. 13g)
(A10) Ionic machining of the gold and the attaching layer Ti/Au (FIG. 13h), B. Cases in which a positive mask is used:
(B5) Depositing a uniform gold layer 60 by electrolysis (FIG. 13i),
(B6) Depositing a thin positive resin 61 (1 μm) (FIG. 13j),
(B7) Putting a positive mask 62 in place, alignment and insulation; the solid parts mark out the future electrodes (FIG. 13k),
(B8) Withdrawal of the non-insulated zones, leaving microbands 63 (FIG. 13l),
(B9) Ionic machining of the gold layer and the attaching layer Ti/Aug (FIG. 13m).

What we claim is:

1. An electro-optical directional coupler, of the kind comprising a light-propagating structure formed by a substrate containing a first optical wave guide and a second optical wave guide parallel with the first one, the structure being covered by a structure of electrodes comprising at least two conductive microbands deposited on the substrate and each covering at least partially one of the two optical guides, the microbands having one end electrically connected respectively to the central conductor and to the external conductor of a coaxial supply line itself connected to an electric wave generator, the other end of the microbands being connected to an adapted load, the structure of electrodes behaving, for the electric supply wave, like a propagating line having a certain characteristic impedance, the dimensions of the microbands (width and distance apart) being selected so that such characteristic impedance has a predetermined adaptation value, wherein to be able to use a structure with alternating dephasing comprising a succession of sections in which the dephasings between the optical waves propagated in the two guides have opposite signs, (a) the structure of electrodes comprises in each section a first, a second and a third parallel microband of identical length, the first and second microband covering the first or the second optical guide respectively, the two microbands being separated by a width G giving to the propagating line formed by the two microbands a characteristic impedance equal to the required adaptation impedance, the third microband being at a distance D from the second microband, D being large enough for the contribution of the former to such characteristic impedance to be negligible, the first and third microbands being connected electrically to the external conductor of the supply line, and the second microband being connected to the central conductor of such line, (b) the covering of the first and second optical guides by the first and second microbands alternates from one section to the following section in the sense that, for a first section, it is the first microband which covers the first guide and the second microband which covers the second guide, while for a second section consecutive to the first section, it is the second microband which covers the second guide, (c) the passage between a first section and a second section is obtained by a transition zone comprising: a first, inclined microband section connecting the first microband of the first section situated on the first optical guide to the third microband of the second section, a second inclined microband section connecting the second microband of the first section situate on the second optical guide to the second microband of the second section situated on the first optical guide, and a third inclined microband section connecting the third microband of the first section to the first microband of the second section situated on the second optical guide;

the second microband being separated from the first and third microbands by the width (G+D)/2 said width being choosen so that the impedance of the two lines formed by second microband and first microband and by second microband and third microband are twice said required adaptation impedance.

* * * * *